June 17, 1952   R. J. HARTZ   2,600,762
STARTER GENERATOR
Filed Aug. 4, 1951

INVENTOR.
RAYMOND J. HARTZ
BY
ATTORNEY

Patented June 17, 1952

2,600,762

UNITED STATES PATENT OFFICE 2,600,762

STARTER GENERATOR

Raymond J. Hartz, Cuyahoga Falls, Ohio, assignor to Jack & Heintz Precision Industries, Inc., Cleveland, Ohio, a corporation of Delaware Application August 4, 1951, Serial No. 240,361

7 Claims. (Cl. 74—810)

This invention relates in general to devices and systems for starting an engine and for generating electrical energy from the power of the engine during its operation.

One of the primary objects of the invention is to provide a simple, practical and efficient gear drive unit capable of functioning as a reduction drive from an electric motor to an engine gear drive from an electric motor to an engine to start the latter, and upon starting of the engine to function as a direct non-reduction drive from the engine to the electric motor when the latter acts as a generator.

Another object is to provide a gear drive of this character in which the gears are at all times in full mesh so as to eliminate any possibility of stripping or otherwise damaging the gears when the unit is shifted from its positions of direct and of reduction drives.

A further object is to construct such a drive that employs a simple internal gear splined to the output shaft, a pinion in driving engagement with the input shaft of the motor, gears in driving engagement with the internal gear, and idler gears in driving engagement with the pinion gear and those in driving engagement with the internal gear, all as a simple unit necessitating no internal modification to constitute an automatic shifting unit that bodily moves between direct and reduction drives.

A further object is to provide the simplest and most effective means for transforming such a gear unit into a unit that automatically shifts between direct and reduction drives in response to applied torque.

A further object is to provide such automatic shifting means so as to merely comprise a helical spline drive between the motor shaft and the pinion and releasable locking means between the carrier and the internal gear for direct drive to the motor, as a generator, and releasable locking means, effective only when the other locking means is released, for effecting a reduction drive from the motor, as a starter, the helical spline drive, in automatic response to torque reaction, and in conjunction with the two opposite alternate locking means, constituting the shifting means for the gear unit between its positions of direct and reduction drives.

With the foregoing and other objects in view, the invention resides in the combination of parts and in the details of construction hereinafter set forth in the following specification and appended claims, certain embodiments thereof being illustrated in the accompanying drawings, in which:

Figure 1 is a view in section taken along line 1—1 of Figure 3 and a view in side elevation, partly broken away of one end portion of an electric machine, such as a generator, there also being shown, partly in section and partly in side elevation, the motor shaft, the output shaft, the gear drive, gear train, its carrier, the pinion and its helical spline drive connection with the motor shaft, the carrier being shown locked to the output shaft carried internal gear for direct drive of the motor as a generator.

Figure 1:
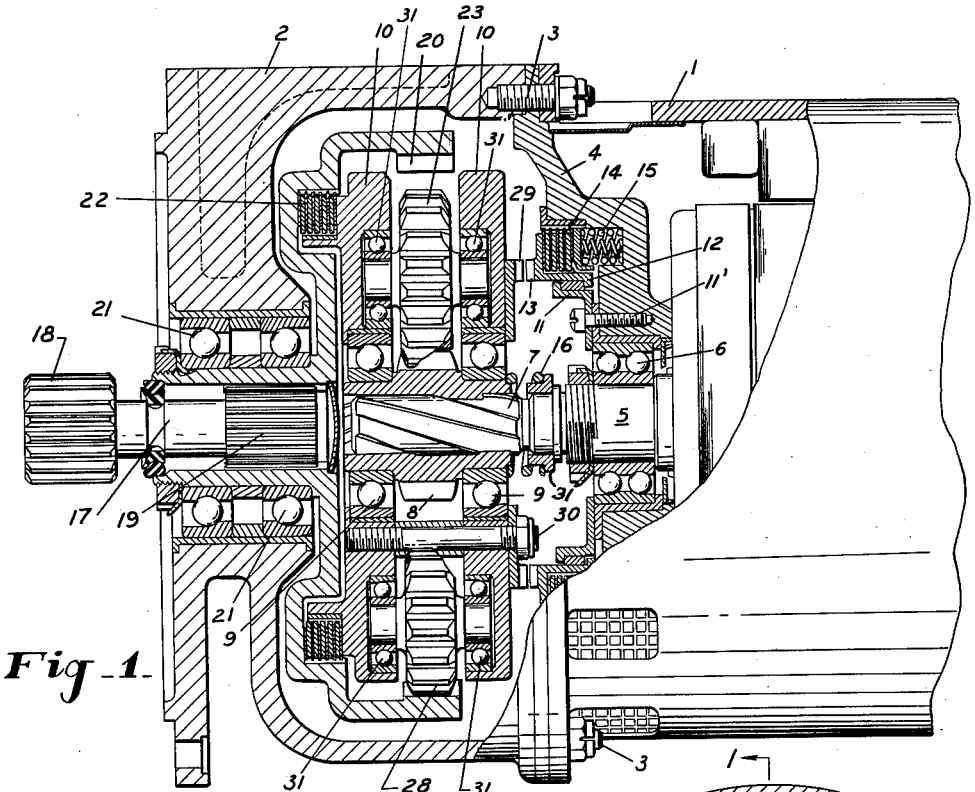

Referring more particularly to the drawings, one end of an electrical machine, or motor, such as a generator, is shown at 1, to which is secured a housing 2 by a series of screw bolts 3, which latter also secure the outer circular flange of an internal wall 4 to housings 1 and 2.

The motor shaft 5 is supported by bearings 6 in the internal housing wall 4 and has an end portion helically splined at 7. A matching internal spline is broached into the pinion 8 of the gear train. On pinion 8 two radial thrust bearings 9 are mounted to support the gear carrier 10.

To the housing wall 4 is secured, by means of a screw bolt 11', a bracket 11 for longitudinally slidably supporting a clash clutch assembly including a collar 12 carrying clutch teeth 13, the collar being backed up by a clutch including friction discs 14 and a compression coil spring 15. Interposed between pinion 8 and a collar 31, carried by shaft 5, is a compression coil spring 16 that normally forces the pinion and carrier to the left to maintain teeth 29 carried by the carrier out of engagement with the complementary teeth 13 of the clash clutch assembly. The output quill shaft 17 has its output end splined at 18 for suitable connection to the engine or turbine, not shown. Shaft 17 also has external splines 19 to mate with internal splines of an internal gear 20 which is rotatably supported by bearings 21 in housing 2. A friction clutch assembly 22 comprises a series of friction discs alternately splined to the carrier 10 and to internal gear 20.

Figures 2, 3:
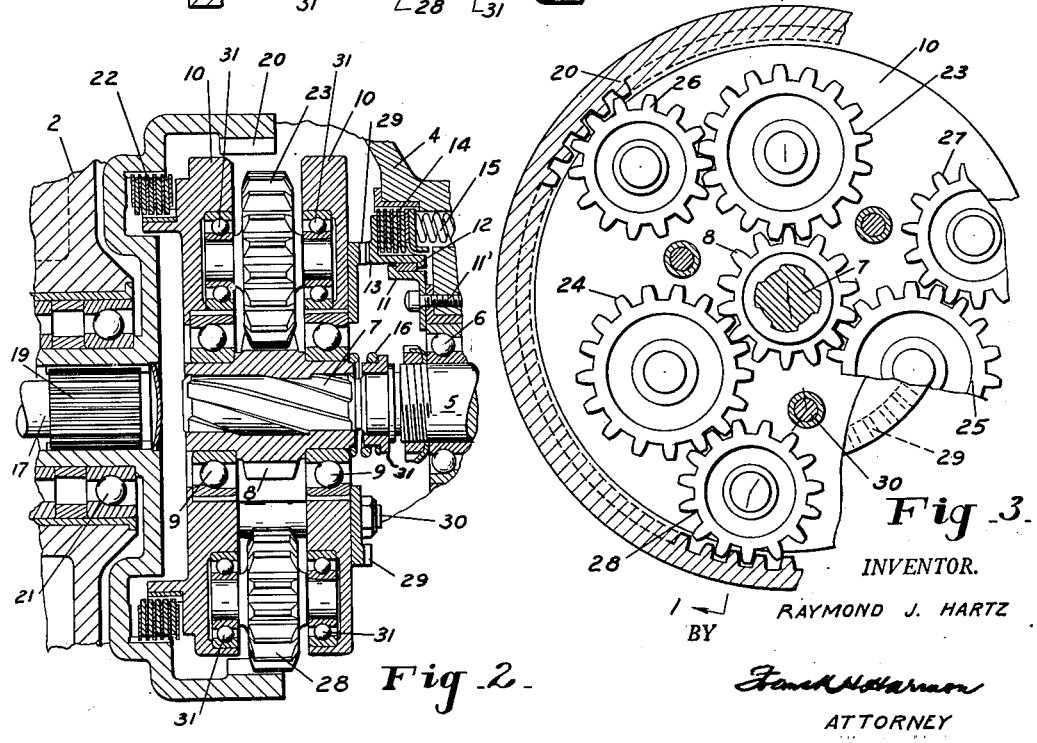
Figure 2 is a view similar to Figure 1, showing the gear drive carrier shifted out of locked engagement with the internal gear and into locked engagement with the housing for reduction drive of the output shaft for engine starting purposes.
Figure 3 is a cross sectional view showing the pinion and the internal gear and the gear train therebetween.

The carrier 10 is made up of two parallel spaced members held together by screw bolts 30, for carrying the gear train therebetween and for supporting them in bearings 31. As shown in Figure 3, the gear train, in addition to pinion 8, includes idler gears 23, 24 and 25, which are at all times in mesh with pinion 8 and also in mesh with gears 26, 28 and 27, respectively, and gears 26, 28 and 27 are at all times in mesh with internal gear 20.

The unit is shown in normal at-rest position in Figure 1, with the clash clutch 13, 29 disengaged and the carrier 10 locked by friction clutch 22 to the internal gear 20. By any suitable means, the motor or generator may be energized for engine starting purposes to rotate its shaft 5, including its splined portion 7. When this torque is applied by the motor, acting as a starter, the pinion 8 and the carrier 10 are pulled by the helical spline linearly to the right toward the starter from the position of Figure 1 to the position of Figure 2, against the action of spring 16, to engage the clash clutch 13, 29 backed up by the friction clutch 12, 14 and spring 15. When thus engaged, this clash clutch assembly locks the carrier with the stationary housing. This causes the unit and its gear train to become effective as a means for reducing the speed of the output shaft 17 and for increasing the torque for engine starting purposes.

When the engine is started, or the turbine starts to operate, this torque applied to shaft 17 takes over and forces the pinion and carrier, due to the helical spline, to move to the left, with the aid of spring 16, toward the engine end of the unit, as shown in Figure 2. Besides unlocking the carrier from the housing, this longitudinal shift of the unit, including the pinion and carrier, locks the carrier to the internal gear. Thus, the entire unit is locked to act as a coupling and drive the generator directly. Spring 15 is placed between the carrier and the friction clutch 12, 14, to act as a torque limiting device when the unit is to operate as a starter drive. The purpose of spring 16 is to normally force the gear drive unit into locked position to act as a direct drive for the motor as a generator.

Thus, it will be seen that there has been provided a simple, effective, self-contained starter generator gear drive, which as a compact unit, is bodily shifted automatically in response to applied torques by simple automatically operating means to permit the starter to drive at high speed on the output end, allowing maximum torque to start the engine, or turbine, in motion. After the engine, or turbine, is in operation, the gearing unit becomes ineffective and is driven at shaft speed to obtain the correct driving speed when the unit is to act as a generator drive.

I claim:

1. In combination in an electric motor starter generator, a stationary housing, a motor shaft, an output shaft adapted for connection to an engine, or the like, an internally toothed gear splined to said output shaft, a pinion helically splined to said motor shaft for simultaneous rotation and linear movement in either direction on said motor shaft, a gear drive unit supported by said pinion and comprising a gear carrier for carrying a reduction gear train between said pinion and said internal gear, a clutch between said carrier and said internal gear, for holding said pinion and said carrier into locked engagement with said internal gear for adapting said gear drive unit to act as a direct non-reduction drive from the engine operated output shaft to said motor shaft for generating electrical energy in said motor, a second clutch having complementary parts carried by said carrier and said housing, said motor shaft, upon energization of said motor, being adapted to linearly move said pinion in the opposite direction to engage said second clutch and establish a reduction gear drive from said motor shaft through said gear drive unit to said output shaft for engine starting purposes.

2. In combination in an electric motor starter generator, a stationary housing, a motor shaft, an output shaft adapted for connection to an engine, or the like, an internally toothed gear splined to said output shaft, a pinion helically splined to said motor shaft for simultaneous rotation and linear movement in either direction on said motor shaft, a self-contained gear drive unit supported by said pinion and comprising a gear carrier for carrying a reduction gear train between said pinion and said internal gear, a disc clutch between said carrier and said internal gear for holding said pinion and said carrier into locked engagement with said internal gear for adapting said gear drive unit to act as a direct non-reduction drive from the engine operated output shaft to said motor shaft for generating electrical energy in said motor, a second clutch having complementary parts carried by said carrier and said housing, said motor shaft, upon energization of said motor, being adapted to linearly move said pinion in the opposite direction to engage said second clutch and establish a reduction gear drive from said motor shaft through said gear drive unit to said output shaft for engine starting purposes.

3. In combination in an electric motor starter generator, a stationary housing, a motor shaft, an output shaft adapted for connection to an engine, or the like, an internally toothed gear splined to said output shaft, a pinion helically splined to said motor shaft for simultaneous rotation and linear movement in either direction on said motor shaft, a self-contained gear drive unit supported by said pinion and comprising a gear carrier for carrying a reduction gear train between said pinion and said internal gear, the gears of said gear train being in constant mesh with each other and said pinion and internal gear, a disc clutch between said carrier and said internal gear for holding said pinion and said carrier into locked engagement with said internal gear for adapting said gear drive unit to act as a direct nonreduction drive from the engine operated output shaft to said motor shaft for generating electrical energy in said motor, a second clutch including complementary clutch members carried by said housing and said carrier, said motor shaft, upon energization of said motor, being adapted to linearly move said pinion in the opposite direction to engage said second clutch and establish a reduction gear drive from said motor shaft through said gear drive unit to said output shaft for engine starting purposes.

4. In combination in an electric motor starter generator, a stationary housing, a motor shaft, an output shaft adapted for connection to an engine, or the like, an internally toothed gear splined to said output shaft, a pinion helically splined to said motor shaft for simultaneous rotation and linear movement in either direction on said motor shaft, a self-contained gear drive unit supported by said pinion and comprising a gear carrier for carrying a reduction gear train between said pinion and said internal gear, the gears of said gear train being in constant mesh with each other and said pinion and internal gear, a friction disc clutch between said carrier and said internal gear, spring means for normally urging said pinion linearly on said pinion and said carrier into locked engagement with said internal gear through said friction clutch for adapting said gear drive unit to act as a direct nonreduction drive from the engine operated output shaft to said motor shaft for generating electrical energy in said motor, a second clutch including complementary clutch members carried by said carrier and said housing, said motor shaft, upon energization of said motor, being adapted to linearly move said pinion in the opposite direction to engage said second clutch and establish a reduction gear drive from said motor shaft through said gear drive unit to said output shaft for engine starting purposes.

5. In combination in an electric motor starter generator, a stationary housing, a motor shaft, an output shaft adapted for connection to an engine, or the like, an internally toothed gear splined to said output shaft, a pinion helically splined to said motor shaft for simultaneous rotation and linear movement in either direction on said motor shaft, a self-contained gear drive unit supported by said pinion and comprising a gear carrier for carrying a reduction gear train between said pinion and said internal gear, the gears of said gear train being in constant mesh with each other and said pinion and internal gear, a friction disc clutch between said carrier and said internal gear for holding said pinion and said carrier into locked engagement with said internal gear for adapting said gear drive unit to act as a direct non-reduction drive from the engine operated output shaft to said motor shaft for generating electrical energy in said motor, a clash clutch including a toothed ring rigidly secured to said carrier and a complementary toothed ring carried in said housing for longitudinal movement against a spring actuated friction disc torque release device, said motor shaft, upon energization of said motor, being adapted to linearly move said pinion in the opposite direction to engage said clash clutch and establish a reduction gear drive from said motor shaft through said gear drive unit to said output shaft for engine starting purposes.

6. In combination in an electric motor starter generator, a stationary housing, a motor shaft, an output shaft adapted for connection to an engine, or the like, an internally toothed gear splined to said output shaft, a pinion helically splined to said motor shaft for simultaneous rotation and linear movement in either direction on said motor shaft, a self-contained gear drive unit supported by said pinion and comprising a gear carrier for carrying a reduction gear train between said pinion and said internal gear, a friction disc clutch between said carrier and said internal gear, spring means for normally urging said pinion linearly on said pinion and said carrier into locked engagement with said internal gear through said friction clutch for adapting said gear drive unit to act as a direct non-reduction drive from the engine operated output shaft to said motor shaft for generating electrical energy in said motor, a clash clutch including a toothed ring rigidly secured to said carrier and a complementary toothed ring carried in said housing for longitudinal movement against a spring actuated friction disc torque release device, said motor shaft, upon energization of said motor, being adapted to linearly move said pinion in the opposite direction to engage said clash clutch and establish a reduction gear drive from said motor shaft through said gear drive unit to said output shaft for engine starting purposes.

7. In combination in an electric motor starter generator, a stationary housing, a motor shaft, an output shaft adapted for connection to an engine, or the like, an internally toothed gear splined to said output shaft, a pinion helically splined to said motor shaft for simultaneous rotation and linear movement in either direction on said motor shaft, a self-contained gear drive unit supported by said pinion and comprising a gear carrier for carrying a reduction gear train between said pinion and said internal gear, the gears of said gear train being in constant mesh with each other and said pinion and internal gear, a friction disc clutch between said carrier and said internal gear, a spring means for normally urging said pinion linearly on said pinion and said carrier into locked engagement with said internal gear through said friction clutch for adapting said gear drive unit to act as a direct non-reduction drive from the engine operated output shaft to said motor shaft for generating electrical energy in said motor, a clash clutch including a toothed ring rigidly secured to said carrier and a complementary toothed ring carried in said housing for longitudinal movement against a spring actuated friction disc torque release device, said motor shaft, upon energization of said motor, being adapted to linearly move said pinion in the opposite direction to engage said clash clutch and establish a reduction gear drive from said motor shaft through said gear drive unit to said output shaft for engine starting purposes.

RAYMOND J. HARTZ.

No references cited.